United States Patent [19]

Christell

[11] Patent Number: 5,087,652
[45] Date of Patent: Feb. 11, 1992

[54] ASPHALT BLENDS WITH CHLOROPRENE POLYMERS OR COPOLYMERS THEREOF WITH DICHLOROBUTADIENE

[75] Inventor: Lance A. Christell, Prospect, Ky.

[73] Assignee: E. I. Du Pont de Nemours and Company, Wilmington, Del.

[21] Appl. No.: 374,130

[22] Filed: Jun. 30, 1989

[51] Int. Cl.$^5$ .............................................. C08L 95/00
[52] U.S. Cl. ....................................... 524/59; 524/60
[58] Field of Search ................................. 524/59, 60

[56] References Cited

U.S. PATENT DOCUMENTS

| | | | |
|---|---|---|---|
| 3,026,280 | 3/1962 | Apotheker | 524/60 |
| 3,933,710 | 1/1976 | Fukushi et al. | 524/61 |
| 3,963,659 | 6/1976 | Binder et al. | 524/70 |
| 4,036,799 | 7/1977 | Wertermann | 524/62 |
| 4,100,123 | 7/1978 | Wertermann | 524/62 |
| 4,340,518 | 7/1982 | Nolte et al. | 524/61 |

FOREIGN PATENT DOCUMENTS

| | | | |
|---|---|---|---|
| 60821 | 5/1977 | Japan . | |
| 28328 | 3/1979 | Japan | 524/59 |
| 184059 | 8/1987 | Japan . | |
| 205360 | 8/1988 | Japan . | |

OTHER PUBLICATIONS

"Chloroprene Polymers", Encyclopedia of Polymer Science and Engineering, vol. 3, Second Edition, 1985, p. 445.

Primary Examiner—Carman J. Seccuro

[57] ABSTRACT

Blends of asphalt and 0.1 to 5 weight percent of a chloroprene polymer are disclosed. The chloroprene polymers can contain up to 12 weight percent 2,3-dichlorobutadiene-1,3 a vinyl monomer or mixtures thereof. The chloroprene polymers are mercaptan-modified or dialkyl- or dialkoxy xanthogen disulfide-modified chloroprene polymers having a gel content of 10 to 50 weight percent and preferably from 20 to 40 weight percent.

6 Claims, No Drawings

ASPHALT BLENDS WITH CHLOROPRENE POLYMERS OR COPOLYMERS THEREOF WITH DICHLOROBUTADIENE

BACKGROUND OF THE INVENTION

1. Field of the Invention

The present invention relates to blends of asphalt with polymers of chloroprene or copolymers thereof containing up to 12 weight percent 2,3-dichlorobutadiene-1,3 or a vinyl monomer.

2. Prior Art

U.S. Pat. No. 3,026,280 discloses blends of asphalt with copolymers of 20 to 80 weight percent 2-chloro-1,3-butadiene and 20 to 80 weight percent 2,3-dichlorobutadiene-1,3. Sufficient dodecyl mercaptan is present in the reaction mixture used to prepare the copolymer to insure that a copolymer having a low gel content is produced.

SUMMARY OF THE INVENTION

The present invention relates to blends of asphalt and chloroprene polymers. The chloroprene polymers consist essentially of polymerized chloroprene and optionally up to 12 weight percent 2,3-dichlorobutadiene-1,3, an ethylenically unsaturated monomer copolymerizable with chloroprene or mixtures thereof. The chloroprene polymers contain from 10 to 50 and preferably 20 to 40 weight percent gel to provide unexpectedly improved ductility for the blends.

DETAILED DESCRIPTION

Incorporating small amounts of polychloroprene under certain conditions into asphaltic materials is known to improve certain physical properties which are closely related to the performance of these asphalts as roads or other paving materials. Even though the amount of chloroprene polymer used may be only about 3% of the asphalt, the increased cost on a percentage basis for an inexpensive material such as asphalt is high. This increase in cost is justified by the improvement in the properties of the asphalt, generally in much longer life for the road surface made from such asphalt.

It has now been found that certain polymers of chloroprene have a significantly greater effect than previously used chloroprene polymers on asphalt.

More specifically the present invention is directed to a composition comprising a bituminous material, i.e. asphalt, having incorporated therein about 0.1 to 5.0 percent by weight, as based on the asphalt present, of a chloroprene polymer which is an alkyl mercaptan-modified, dialkyl- or dialkoxy xanthogen disulfide-modified polychloroprene containing up to 12 weight percent 2,3-dichlorobutadiene-1,3, a monoethylenically unsaturated monomer containing from 3 to 10 carbon atoms or mixtures thereof. The ethylenically unsaturated monomer may be further described as a vinyl monomer having a boiling point of from 0° to 200° C. Monomers having boiling points below 0° C. will not be liquids in the polymerization emulsion. Monomers having boiling points above 200° C. create problems in removing unreacted monomers by low pressure steam stripping, the process commonly used to remove unreacted chloroprene from the reaction mixture. Further, the vinyl monomer has to be reactive with 2-chloro-1,3-butadiene and emulsifiable or soluble in water. Preferably the vinyl monomer contains a polar substituent so that the product copolymer retains the resistance to swelling or solvating effect by asphalt provided by polychloroprene rather than the less expensive hydrocarbon rubbers. Thus the preferred vinyl monomers are acrylonitrile; methacrylonitrile, lower alkyl acrylates, methacrylates, acrylamides, methacrylamides, maleates and fumarates; acrylic acid; methacrylic acid; fumaric acid; and maleic acid. The vinyl monomers are generally less reactive than 2-chloro-1,3-butadiene in contrast to 2,3-dichloro-1,3-butadiene which is more reactive. This difference in reactivity must be taken into account when preparing the polymerization recipes. The chloroprene polymer contains from 10 to 50 weight percent and preferably from 20 to 40 weight percent highly crosslinked, tetrahydrofuran insoluble, chloroprene polymer gel. The polychloroprene is an alkyl mercaptan-modified, dialkyl- or dialkoxy xanthogen disulfide-modified polychloroprene which preferably is mercaptan modified. The alkyl mercaptan modifiers suitable for use in the invention generally have chain lengths of about from 4–20 carbon atoms. The alkyl radicals may be straight-chained or branched, and they may be primary, secondary, or tertiary. It is preferred that the alkyl radicals have about 8–16 carbon atoms. Examples include octyl mercaptan, dodecyl mercaptan, tert-dodecyl mercaptan, tridecyl mercaptan, and mixtures of mercaptans derived from coconut oil (often known as lauryl mercaptan or technical dodecyl mercaptan). Dodecyl mercaptan is particularly preferred.

The dialkyl xanthogen disulfides can be represented by the structure

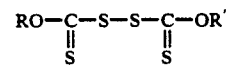

wherein R and R, are alkyl radicals having 1–8 carbon atoms. Examples of suitable alkyl radicals are methyl ethyl, propyl, isopropyl, and the various isomeric butyl, amyl, hexyl, heptyl, and octyl radicals. The preferred dialkyl xanthogen disulfides are those in which each alkyl radical has 1-4 carbon atoms, especially diisopropyl xanthogen disulfide.

The dialkoxy xanthogen disulfides are compositions of the formula

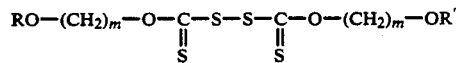

wherein R and R, are alkyl radicals having 1–8 carbon atoms and m is 2 to 6. Examples of suitable alkyl radicals are methyl, ethyl, butyl and hexyl with ethyl being preferred. Generally the modifier content of the polymer is from 0.05 to 0.15 weight percent in order to control gel content produced to the desired range. The chloroprene polymer is prepared by emulsion polymerization at 25° to 50° C. Generally the polymerization is stopped at 65 to 88% chloroprene monomer conversion.

Generally the asphalt employed will have a viscosity of less than about 8,000 Poise (at 140° F.), preferably less than about 4,000 Poise (at 140° F.). Outstanding materials are produced from asphalt having a viscosity of about 500 Poise to about 2,000 Poise (at 140° F.) or less. Asphalt materials which are suitable may be selected from those which are typically used for road paving, repair and maintenance purposes Thus, such asphalt includes natural asphalt, petroleum asphalt and petroleum tar. The natural asphalts include, for example Canadian western slope asphalt. The petroleum asphalt that may be used includes straight asphalt obtained by distillation of a crude oil, blown asphalt, produced by blowing an oxygen-containing gas into straight asphalt, and solvent extracted asphalt. The petroleum tar that may be used includes coal tar and oil gas tar. Preferably, the asphalt which will be employed is an asphalt cement of the type typically used for road paving, repair and maintenance purposes. Such asphalts typically have penetrations ranging between about 20 to about 200 with AC-10 paving grade asphalt being especially suitable.

EXAMPLES

Example 1

A chloroprene copolymer latex is prepared by emulsifying 98 parts by weight of 2-chloro-1,3-butadiene, 2 parts by weight of 2,3-dichloro-1,3-butadiene, and 0.15 parts by weight of dodecyl mercaptan and 3 parts by weight disproportionated rosin in 65 parts by weight water containing 1 part by weight potassium hydroxide and 0.0 part by weight sodium sulfite at 35° C. The catalyst, a 5% aqueous solution of potassium persulfate, was added as necessary to maintain the temperature at 35° C. The polymerization was stopped at a monomer conversion of 71% by addition of a dispersion of phenothiazine. The resultant gel content was 25.7% measured in tetrahydrofuran solvent. This latex (2.75 parts based on the amount of rubber solids) was added to 100 parts of an AC-10 asphalt at about 190° C. with stirring for about 30 minutes. The resultant modified asphalt was then cooled to room temperature. The viscosity of this blend at 140° C. was 2216 Poise (ASTM D-2171). After aging a sample of the modified asphalt at 163.C in a Thin Film Oven (ASTM D-1754) the elongation to break at 4° C. was 54 cm (ASTM D-113, Ductility).

Examples 2–10

Polychloroprenes 2 through 10 were prepared under the conditions summarized in Table 1, and blended with an AC-10 asphalt in the same manner as in Example 1. The viscosity and ductility results are reported in Table 2. A comparison of the ductility values for low-gel and high-gel polychloroprenes with the ductility values for the 10 to 50% gel content polychloroprenes of the present invention illustrates the improved elongation properties provided by the polychloroprenes containing from about 10 to 50% gel.

In Table I, CD stands for chloroprene, ACR stands for 2,3-dichlorobutadiene, AM stands for dodecyl mercaptan.

TABLE 1

| | Polymerization Conditions | | | | | |
|---|---|---|---|---|---|---|
| | Monomer | | | | Con- | Gel |
| Example | CD (%) | ACR (%) | AM (%) | Temp. (°C.) | version (%) | Content (%) |
| 2 | 90 | 10 | 0.15 | 45 | 82 | 16.1 |
| 3 | 98 | 2 | 0.15 | 45 | 84 | 20.2 |
| 4 | 90 | 10 | 0.15 | 35 | 74 | 42.0 |
| 5 | 94 | 6 | 0.15 | 45 | 89 | 6.1 |
| 6 | 94 | 6 | 0.15 | 45 | 73 | 3.8 |
| 7 | 94 | 6 | 0 | 35 | 91 | 82.8 |
| 8 | 98 | 2 | 0.3 | 35 | 82 | 0 |
| 9 | 94 | 6 | 0 | 25 | 82 | 65.9 |
| 10 | 90 | 10 | 0.15 | 25 | 80 | 2.6 |

TABLE 2

| Viscosity and Ductility After Aging | | |
|---|---|---|
| Example | Viscosity (cP) | Ductility (cm) |
| 2 | 2195 | 43 |
| 3 | 1931 | 49 |
| 4 | 2242 | 38 |
| 5 | 1523 | 27 |
| 6 | 3148 | 20 |
| 7 | 1654 | 10 |
| 8 | 1825 | 22 |
| 9 | 1629 | 12 |
| 10 | 2343 | 23 |

Examples 1–4, 11 and 12 are illustrative of the present invention. Examples 5–10 are comparative examples showing inferior ductility of the asphalt/chloroprene polymer blends when the gel content is outside the range of 10 to 50 weight percent of the present invention.

Example 11

A polychloroprene latex is prepared from 100 parts of chloroprene, and 0.08 parts of dodecyl mercaptan emulsified in a water (65 parts)/disproportionated rosin: (3.85 parts) soap solution additionally containing 1 part of the potassium salt of polymerized methylene naphthalenesulfonic acid (Daxad surfactant K11LS), and 0.15 part of a polymerized fatty acid surfactant (Empol 1022) and optionally 0.05 parts of sodium sulfite. Th polymerization was initiated and maintained by addition of a 5% aqueous solution of potassium persulfate at a rate as necessary to maintain the temperature at 35° C. and stopped at a specific gravity of 1.110; corresponding to a monomer conversion of 85.8%. The resultant gel content was 31.2% measured in tetrahydrofuran solvent.

Example 12

A polychloroprene latex is prepared from 94 parts of chloroprene and 6 parts of 2,3-dichloro-1,3-butadiene and 0.1 part of dodecyl mercaptan emulsified in the water solution of Example 11 additionally containing 0.15 parts the temperature of sodium formaldehyde sulfoxylate. The polymerization is initiated and maintained at 25° C. by addition of a 5% aqueous solution of potassium persulfate and stopped at a specific gravity of 1.095; corresponding to a monomer conversion of 82.4%. The resultant gel content was 31.6% measured in tetrahydrofuran solvent.

I claim:

1. A blend of asphalt and 0.1 to 5 weight percent, based on asphalt, of mercaptan-modified or dialkyl- or dialkoxy xanthogen disulfide-modified chloroprene polymer consisting essentially of repeating units derived from chloroprene and up to 12 weight percent of a monoethylenically unsaturated monomer containing 3 to 10 carbon atoms copolymerizable with chloroprene, 2,3-dichlorobutadiene-1,3, or mixtures thereof; which chloroprene polymer is modified by addition of sufficient mercaptan or dialkyl- or dialkoxy xanthogen disulfide to provide a gel content of from 10 to 50 percent by weight, based on chloroprene.

2. The blend of claim 1 wherein the chloroprene polymer consists essentially of repeating units derived from chloroprene and up to 12 weight percent 2,3-dichlorobutadiene-1,3.

3. The blend of claim 2 wherein the chloroprene polymer is an alkyl mercaptan modified chloroprene polymer.

4. The blend of claim 3 wherein the chloroprene polymer contains from 20 to 40 weight percent gel.

5. The blend of claim 4 wherein the chloroprene polymer contains from 4 to 8 weight percent 2,3-dichlorobutadiene-1,3.

6. The blend of claim 4 wherein the chloroprene polymer is a dodecyl mercaptan modified polymer containing from 0.05 to 0.15 weight percent dodecyl mercaptan.

* * * * *